United States Patent Office 3,455,948
Patented July 15, 1969

3,455,948
2-AMINOBENZIMIDAZOLE AND A PROCESS FOR PREPARING 2-AMINOBENZIMIDAZOLES
Robert John Stedman, Paoli, Pa., assignor to Smith Kline & French Laboratories, Philadelphia, Pa., a corporation of Pennsylvania
No Drawing. Filed Nov. 9, 1966, Ser. No. 592,983
Int. Cl. C07d *49/38;* A61k *27/00;* C07c *157/04*
U.S. Cl. 260—309.2                                    11 Claims

ABSTRACT OF THE DISCLOSURE

N-(o-aminophenyl)thioureas, optionally further substituted on the benzene ring, are treated with mercuric oxide to give 2-aminobenzimidazoles, useful as intermediates in the preparation of anthelmintic compounds.

---

The present invention relates to a chemical process for preparing benzimidazoles. In particular, the invention relates to a process for preparing 2-aminobenzimidazoles, optionally substituted on the benzene ring.

The present invention consists of a process for preparing 2-aminobenzimidazoles comprising ring-closing an N-(o-aminophenyl)thiourea (I) with mercuric oxide to give a 2-aminobenzimidazole (II).

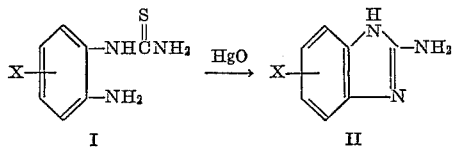

The substituent on the benzene ring, as represented by X, may be any group that does not react with mercuric oxide. For example, X may be hydrogen; lower alkyl such as methyl, ethyl, propyl, or butyl; lower alkoxy such as methoxy, ethoxy, propoxy, or butoxy; chloro; bromo; trifluoromethyl; or nitro.

The ring-closure reaction is best carried out by adding the thiourea starting material over a short period of time to an excess of mercuric oxide in a solvent such as absolute alcohol. The reaction mixture is stirred at about 50–80° for a period of about 5 to 30 minutes. Substantial completion of the reaction is evidenced by failure of subsequently added mercuric oxide to cause darkening of a portion of the supernatant portion of the reaction mixture. The precipitated mercuric sulfide is filtered off, the solvent is evaporated, and the residual product purified by recrystallization.

Mercuric oxide is best employed in an amount equal to about 5 to 10 molar equivalents of thiourea, although amounts equal to as little as 1 molar equivalent will result in partial ring-closure. Best yields are obtained, however, with larger amounts. Although mercuric oxide is the preferred reagent for accomplishing the ring-closure, it should be understood that certain other heavy metal oxides or salts which form insoluble sulfides are equivalent to mercuric oxide for this purpose. Lead oxide and cupric oxide are examples of such equivalent reagents.

The choice of solvent, reaction time, and temperature are not critical to the practice of the invention, since the formation of the mercuric sulfide, which is the driving force for the reaction, occurs sufficiently readily under conditions of temperature, time, and solvent which are within the normal range of laboratory practice.

Therefore, solvents such as ethanol, methanol, isopropanol, acetone, and ethyl acetate, as long as they provide sufficient solubility for the reactants to enable the reaction to proceed, are usable. The reaction time can be from about 5 minutes to several hours. The reaction temperature can be from about room temperature (25°) to the reflux temperature of the particular solvent used, the preferred range being about 55°–85°. As in most organic chemical reactions, shorter time periods are needed at higher reaction temperatures, but yield and purity of product are adversely affected by maintenance of higher temperatures for longer periods of time.

The thiourea starting materials used in the present process are prepared by refluxing for about an hour an aqueous solution of the hydrochloride salt of an optionally substituted o-phenylenediamine with potassium thiocyanate, according to the procedure described in Archiv. der Pharmazie, 241, 165 (1903). The substituted o-phenylenediamines are either known to the art or are prepared by known methods.

The 2-aminobenzimidazole products of the inventive process are valuable intermediates useful for preparing a variety of anthelmintic agents, active against such helminths as *S. obvelata, N. dubius,* and *A. Suum* in doses of 5–250 mg./kg. These active compounds are prepared by acylation of the 2-amino group with straight and branched chain alkanoyl halides such as acetyl chloride, propionyl chloride, butyryl chloride, or isobutyryl chloride; cycloalkyl carboxylic acid halides such as cyclopropyl or cyclobutyl carboxylic acid chloride; and heterocyclic acid chlorides such as furan-2-carboxylic acid chloride.

The present invention also includes certain intermediate compounds produced by the claimed process, which compounds are useful in the preparation of active anthelmintic compounds. These intermediates are represented by the following structural formula:

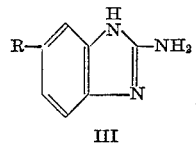

III where R is lower alkyl of 3–6 carbon atoms or lower alkoxy of 3–6 carbon atoms. Of particular importance are the compounds where R is butyl or propoxy. As described above, these intermediate compounds are acylated by reaction with acid halides to give the active products. They may also be treated with alkyl isocyanates such as methyl isocyanate to give benzimidazoleurea products, which are also active anthelmintics.

The following examples are intended to illustrate the process of the invention, but are not to be construed as limiting the scope thereof.

EXAMPLE 1

2-aminobenzimidazole

To a mixture of 8.5 g. of HgO in 50 ml. of absolute ethanol at 70° is added over a 5 minute period 1.41 g. (0.0084 mole) of N-(o-aminophenyl)thiourea. The mixture is then stirred at 70–75° for 15 min. after the addition is complete and an additional 4 g. of HgO added. Further addition of 8 g. of HgO in 2 portions and heating over a 15 min. interval results in completion of the reaction. The mixture is vacuum-filtered while hot and the filtrate evaporated at 40° to give an 84% yield of the title product as a crystalline solid, M.P. 225–228°.

EXAMPLE 2

When the following substituted aminophenylthioureas are subjected to the conditions of the HgO ring-closure, as described in Example 1, the corresponding listed substituted 2-aminobenzimidazoles are obtained.

Starting material: N-(2-amino-3-methylphenyl)thiourea
Product: 2-amino-4-methylbenzimidaazole
Starting material: N-(2-amino-4-chlorophenyl)thiourea
Product: 2-amino-5-chlorobenzimidazole
Starting material: N-(2-amino-4-butylphenyl)thiourea
Product: 2-amino-5-butylbenzimidazole
Starting material: N-(2-amino-4-nitrophenyl)thiourea
Product: 2-amino-5-nitrobenzimidazole
Starting material: N-(2-amino-4-trifluoromethylphenyl)thiourea
Product: 2-amino-5-trifluoromethylbenzimidazole
Starting material: N-(2-amino-4-propoxyphenyl)thiourea
Product: 2-amino-5-propoxybenzimidazole
Starting material: N-(2-amino-3-phentylphenyl)thiourea
Product: 2-amino-4-pentylbenzimidazole

EXAMPLE 3

2-propionamidobenzimidazole

Ten grams of 2-aminobenzimidazole are added to 60 ml. of pyridine; the mixture is held at 0–4° with stirring and 6.95 g. of propionyl chloride are added slowly. The reaction mixture is stirred for 10 minutes in an ice bath and allowed to stand at room temperature for one hour, followed by heating on a steam bath an additional hour. The reaction mixture is cooled and poured into approximately 3 volumes of water. The white crystalline solid which forms is collected, washed with water and dried, yielding 4.8 g. of crude product, M.P. 254.0–255.5°.

The product is recrystallized twice from ethanol to give colorless crystals, M.P. 257–258.5°. The structure of the desired product is confirmed by elemental analysis and by IR and NMR spectral data.

EXAMPLE 4

2-cyclobutanecarboxamidobenzimidazole 5.6 g. of 2-aminobenzimidazole is added to 34 ml. of pyridine and the mixture is held at 0–4°, with 5.0 g. of cyclobutanecarboxylic acid chloride being added slowly with stirring. The mixture is then stirred at room temperature for one hour, followed by heating on a steam bath for an additional hour. The mixture is poured into 5 volumes of water to precipitate a white solid, which is collected by filtration and air-dried, yielding 7.55 g. of crude product, M.P. 268–269.5°.

The product is recrystallized twice from methanol, yielding 3.36 g. of purified product, M.P. 268.5–269.5°. The structure of the desired product is confirmed by elemental analysis, and IR and NMR spectral data.

EXAMPLE 5

2-(2-furoylamino)benzimidazole 2-aminobenzimidazole (10.0 g., 0.075 mole) is dissolved in 60 ml. of dry pyridine and the solution cooled in ice. To this stirred and cooled solution is added dropwise 9.75 g. (0.075 mole) of furan-2-carboxylic acid chloride over a 25 minute period. The mixture is stirred with cooling for 15 minutes, at room temperature for an hour, and on a steam bath for an hour, and then 200 ml. of water is added. After the mixture is cooled, the resulting solid is filtered off and dried. The crude product is placed in 400 ml. of 1:1 water-ethanol an sufficient 10% sodium hydroxide added to achieve solution. The solution is filtered through Super-Cel and the filtrate neutralized to pH 6.0. The resulting solid is filtered off, washed with 1:1 water-ethanol, and dried. The compound is recrystallized by dissolving in a minimum of dry dimethylformamide and adding dry acetonitrile to the filtered warm solution until turbidity is reached. Cooling produces crystallization. A second crystallization, followed by extraction with hot water and drying, gives the pure title product, M.P. 318–320° dec.

Calc'd for $C_{12}H_9N_3O_2$: C, 63.43; H, 3.99; N, 18.49%. Found: C, 63.47; H, 3.07; N, 18.51%.

To a methanol suspension of the product is added ethereal hydrogen chloride until the solution is red to litmus. The solution is cooled and scratched to give crystals of the product hydrochloride, which are collected and purified by recrystallization.

EXAMPLE 6

1-(5-butyl-2-benzimidazolyl)-3-methylurea

A solution of 11 g. (0.0581 mole) of 5-butyl-2-aminobenzimidazole in 600 ml. of dry pyridine is stirred with cooling in ice and 3.31 g. (0.0581 mole) of methyl isocyanate is added at a moderately fast rate by dropper. The mixture is stirred in an ice bath for 10 minutes, at room temperature for 30 minutes, and then on the steam bath for 1.5 hours. Water (ca. 200 ml.) is added to the solid mass and the solid is collected by filtration, washed with water, and dried; M.P. 228–230°. The sample is suspended in 600 ml. of 50% aqueous ethanol, 75 ml. of 3 N HCl is added to dissolve most of the solid, the mixture is filtered, and the filtrate is neutralized to ca. pH 7.5 with 10 %NaOH to precipitate the title product, which is filtered off and washed with 50% ethanol. Two recrystallizations from 2:1 ethanol-water give the pure product M.P. 231–232°.

EXAMPLE 7

N-(o-aminophenyl)thiourea

A mixture of 10.0 g. (0.0924 mole) of o-phenylenediamine dihydrochloride, 5.56 g. (0.0572 mole) of potassium thiocyanate and 15.4 ml. (0.1848 mole) of conc. HCl in 25 ml. of water is refluxed for 1 hour. The mixture is cooled and filtered, and 25% NaOH added to the filtrate to pH 7. The resulting solid is filtered off and recrystallized by dissolving in 25 ml. of 2 B ethanol at steam bath temperature, filtering, and refrigerating.

I claim:
1. A process for preparing a 2-aminobenzimidazole of the formula

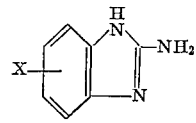

where X is hydrogen, lower alkyl of 1–6 carbon atoms, lower alkoxy of 1–6 carbon atoms, chloro, bromo, trifluoromethyl, or nitro, comprising ring-closing a thiourea of the formula

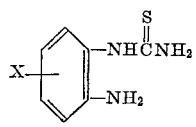

with mercuric oxide.

2. A process as claimed in claim 1, where the ring-closure is conducted in a solvent at a temperature from 25° to the reflux temperature of the solvent.

3. A process as claimed in claim 2, where X is hydrogen, lower alkyl of 1–6 carbon atoms, or lower alkoxy of 1–6 carbon atoms.

4. A process as claimed in claim 3, where X is hydrogen.

5. A process as claimed in claim 3, where X is the product is at the 5-position.
6. A process as claimed in claim 5, where X is butyl.
7. A process as claimed in claim 5, where X is propoxy.
8. A process as claimed in claim 2, where the solvent is absolute ethanol.
9. A process as claimed in claim 3, where the solvent is absolute ethanol.
10. A process as claimed in claim 4, where the solvent is absolute ethanol.
11. 2-amino-5-butylbenzimidazole.

References Cited

UNITED STATES PATENTS 2,933,502   4/1960   Klopping _____ 260—309.2

HENRY R. JILES, Primary Examiner

NATALIE TROUSOF, Assistant Examiner

U.S. Cl. X.R.

260—552, 999